Oct. 18, 1966 R. R. BORCHARDT 3,279,969

METHOD OF MAKING ELECTRONIC CIRCUIT ELEMENTS

Filed Nov. 29, 1962

INVENTOR.
Richard R. Borchardt
BY
L. F. Hammond.
Atty.

United States Patent Office 3,279,969

Patented Oct. 18, 1966

3,279,969
METHOD OF MAKING ELECTRONIC CIRCUIT ELEMENTS

Richard R. Borchardt, Chicago, Ill., assignor to Amphenol Corporation, a corporation of Delaware Filed Nov. 29, 1962, Ser. No. 240,911
2 Claims. (Cl. 156—235)

This invention relates to a unique method of manufacturing electronic circuitry of the general type sometimes designated as "circuit boards," and to an improved circuit sheet which may be produced by the method.

In introduction, it may be pointed out that while so-called "printed circuits" are produced by a wide variety of methods, including etching, plating, printing and other techniques, it is often desirable to transfer the entire circuit from a base metal sheet to some other support without changing the relative positions or exactitude of spacing between the parts.

Since a given circuit may be a rather complex, arbitrary pattern, often consisting of a multitude of individual, separate, conductive metallic strips or ribbons of random shapes and in close spatial array with respect to each other, transfer of such circuits from one support to another is not easily accomplished by conventional means.

It is, however, one of the primary objects of the present invention to provide a method for manufacture of circuit boards which permits removal of electro-formed parts from the base metal on which they have been formed, without adversely affecting the bond between the formed parts and the final adhesive or support. A further object of the invention is the provision of an improved and simplified circuit board or sheet having a high degree of inherent flexibility, whereby it is applicable to various pieces of equipment for which rigid circuit boards are unsuited. A still further object of the invention is to produce circuit sheets which are reliable, reasonably economical and at the same time resistant to impact, physical shock, or continued vibration.

A present preferred embodiment of a circuit sheet manufactured according to the present disclosure is illustrated in the drawing attached to and forming a part of the present specification, wherein.

Figure 1:
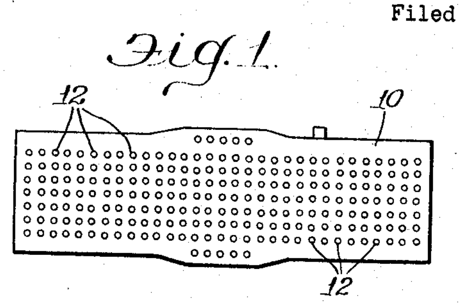
FIGURE 1 is a plan view of a typical flexible laminar circuit sheet constructed in accordance with the present teachings.

The form of the invention shown in FIGURE 1 consists of multiple conductors embedded within a small flexible laminar sheet of flexible insulated plastic. Preferably the assembly consists of an upper layer 10 of pressure-sensitive insulating adhesive tape, superimposed face down over a similar layer of tape 11 having its adhesive side faced upwardly so that the adhesive surfaces of the two tapes are in contact and adhere to each other throughout the majority of their surface areas. Both tapes are preferably perforated by a multiplicity of apertures 12 which, as shown, are arranged in regular spacing both longitudinally and transversely, with the apertures of both layers of tape in exact registry.

Figure 2:
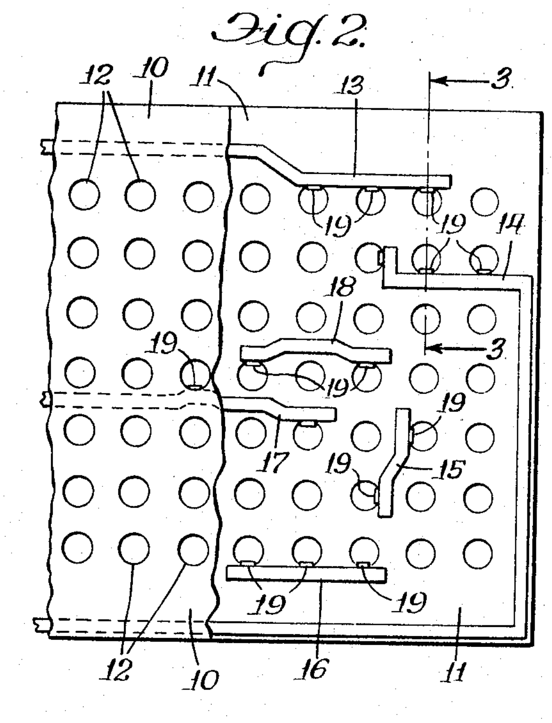
FIGURE 2 is an enlarged fragmental plan view of a portion of the circuit sheet of FIGURE 1, showing part of the upper insulating layer broken away to show a typical internal arrangement of metallic conductors.

The actual circuit elements of the assembly are metallic conductor ribbons, secured between the tape layers. These circuit conductors, generally designated 13, 14, 15, 16, 17 and 18, are preferably in the form of elongated narrow strips of thin metal, each having its major portion disposed between adjacent rows of apertures in the tape (FIGURE 2), but having terminal portions or tabs 19 extended into registry with one of the apertures 12 wherever desired for purposes of making electric contact between the circuit elements 13–18 and the various components with which the circuit board is to be used. To facilitate welding or soldering, all or some of the tabs 19 may be bent outwardly through one of the holes 12 in the tape sheet to lie in a position at right angles to the plane of the tapes 10 and 11.

Figure 4:
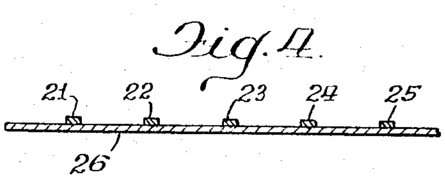
FIGURE 4 is a cross sectional view of a metallic backing sheet, to the upper face of which a plurality of individual circuit conductors have been applied, by electro-plating or otherwise, according to practices heretofore conventional in the art.
Figure 5:
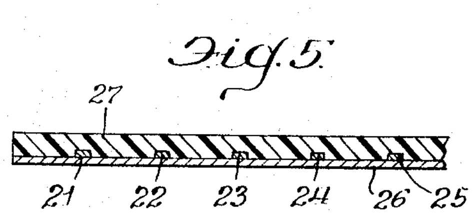
FIGURES 5, 6, 7, 8 and 9 show the several sequential steps whereby a sheet of such conventional plated circuitry is converted into the end product contemplated by the present invention.

The method of making the flexible circuitry thus far disclosed is best illustrated in FIGURES 4 to 9 of the drawings, wherein FIGURE 4 represents a step in the process of manufacture of more conventional circuitry wherein a number of thin, metallic, ribbon-like conductors 21, 22, 23, 24 and 25 have been electroformed (plated) or otherwise deposited on a common backing sheet, such as the thin copper plate 26.

Figure 6:
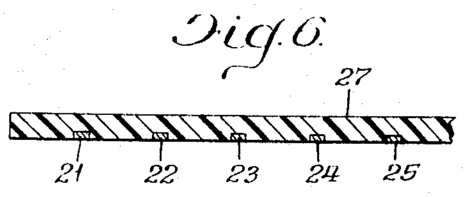

According to the present process, this sheet of plated circuitry is treated by the application of a thin coat of plastisol, applied completely over the metallic circuit elements 21–25 and cured in such a manner that it forms a yieldable, pliant cover layer, with the metallic circuit elements 21–25 completely embedded in the plastisol on all surfaces except the lower surface still covered by the copper sheet 26. The copper sheet is then removed, as by chemical etching, leaving the individual circuit conductors embedded in the plastisol, as indicated in FIGURE 6. At this time, the terminal portions of the conductors which will become tabs, such as shown at 19 in FIGURE 3, lie in the same plane as the conductors 21–25, and are not shown in FIGURES 4 to 9, inclusive.

Figure 7:
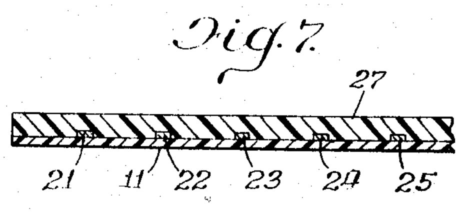
Figure 8:
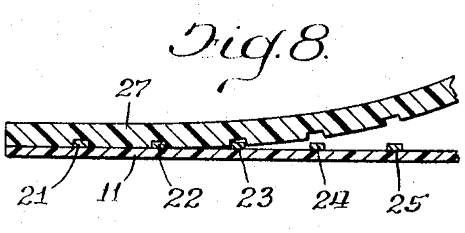
Figure 9:
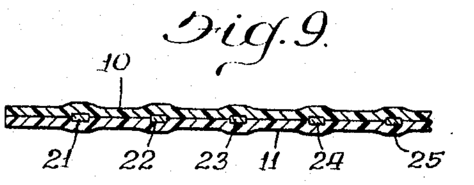

Next, the lower sheet of insulating sheeting 11 is applied in the manner illustrated in FIGURE 7, so that the adhesive surface on the upper surface of the sheet adheres to the lower surfaces of the individual circuit elements. Prior to applying the sheet 11, it may be perforated with openings positioned to overlie the terminal tabs of the conductors. The plastisol cover layer 27 is then peeled off, leaving the individual circuit elements adhering to the adhesive surface of sheet 11. The adhesive maintains the separate pieces of the metallic circuitry in the same precise orientation and spatial arrangement as on the original backing 26, with the terminal portions each located at one of the several apertures in the sheet. The upper layer of adhesive sheeting 10 (with corresponding apertures) is then applied over the upper surface of the circuit elements, and the sheets 10 and 11 may be pressed together so that they will adhere to each other in all areas between the spaced-apart conductors (FIGURE 9).

Figure 3:
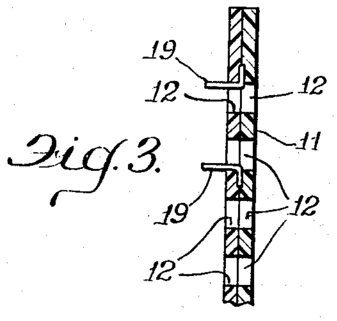
FIGURE 3 is an enlarged detail sectional view taken substantially on the plane of the line 3—3 of FIGURE 2.

Since sheets 10 and 11 may both be punched in advance with apertures corresponding to the locations of the terminal tabs of the circuit conductors, these terminal areas will be left exposed and accessible, and may be bent outwardly through the adjacent aperture to form projecting, weldable connecting means as best shown at 19 in FIGURE 3.

Having thus described my invention, what I claim as new and desire to secure by United States Letters Patent is:

1. The method of manufacturing a thin, flexible laminar insulated circuit board of desired pattern, comprising the steps of applying to one face of a thin flat, smooth metallic backing sheet a plurality of separate, spaced-apart, mutually interrelated conductors, at least some of said conductors having a plurality of terminal tabs lying in the same plane as the conductors and forming a part thereof, said conductors and terminal tabs coacting to form the circuit pattern, applying a coating of plastisol over one surface of said metallic backing sheet and the conductors and tabs thereon to enclose and surround the exposed surfaces of the individual conductors and tabs carried thereon, whereby said conductors and tabs lie within shallow channels in the aforesaid layer of plastisol, curing the plastisol layer, whereby it becomes a yieldable, pliant cover sheet, removing the metallic backing sheet from the cover sheet and from the conductors and tabs by etching said backing sheet entirely away while leaving the individual conductors and tabs embedded in the aforesaid shallow channels of the plastisol layer, with one face of each individual conductor and tab exposed in a position generally flush with the surface of said plastisol layer, whereby the individual conductors and tabs are supported and held in proper orientation and spatial relationship to each other solely by the plastisol cover sheet, overlaying the face surface of the plastisol layer and the conductors and tabs positioned in channels therein by a thin, flexible, perforated dielectric supporting sheet having an open hole overlying each of said tabs, adhesively securing said individual conductors to the adjacent face of the dielectric supporting sheet while leaving the tabs free therefrom within the aforesaid holes, peeling the dielectric supporting sheet and the plastisol cover sheet apart to withdraw the individual conductors and tabs from the aforesaid channels in the face surface of the cover sheet and leave the conductors adhesively supported on the inner face surface of the dielectric supporting sheet, applying a second thin, flexible, perforated dielectric supporting sheet across the exposed surface of the conductors with a perforation of said sheet overlying each of the aforesaid tabs, and adhesively securing said first and second supporting sheets to each other and to the conductors positioned therebetween.

2. The method of manufacturing a thin, flexible laminar insulated circuit board of desired pattern, comprising the steps of applying to one face of a thin, flat, smooth metallic backing sheet a plurality of separate, spaced-apart, mutually interrelated conductors, said conductors coacting to form the circuit pattern, applying a coating of plastisol over one surface of said metallic backing sheet and the conductors thereon to enclose and surround the exposed surfaces of the individual conductors carried thereon, whereby said conductors lie within shallow channels in the aforesaid layer of plastisol, curing the plastisol layer, whereby it becomes a yieldable, pliant cover sheet, removing the metallic backing sheet from the cover sheet and from the conductors by etching said backing sheet entirely away while leaving the individual conductors embedded in the aforesaid shallow channels of the plastisol layer, with one face of each individual conductor exposed in a position generally flush with the surface of said plastisol layer, whereby the individual conductors are supported and held in proper orientation and spatial relationship to each other solely by the plastisol cover sheet, overlaying the face surface of the plastisol layer and the conductors positioned in channels therein by a thin, flexible dielectric supporting sheet, adhesively securing said individual conductors to the adjacent face of the dielectric supporting sheet, peeling the dielectric supporting sheet and the plastisol cover sheet apart to withdraw the individual conductors from the aforesaid channels in the face surface of the cover sheet and leave the conductors adhesively supported on the inner face surface of the dielectric supporting sheet, applying a second thin, flexible dielectric supporting sheet across the exposed surface of the conductors, and adhesively securing said first and second supporting sheets to each other and to the conductors positioned therebetween.

References Cited by the Examiner

UNITED STATES PATENTS

| | | | |
|---|---|---|---|
| 2,463,244 | 3/1949 | Carter | 156—235 |
| 2,692,190 | 10/1954 | Pritikin. | |
| 2,712,591 | 7/1955 | Rogell. | |
| 3,042,741 | 7/1962 | Cumpston | 174—68.5 |
| 3,053,929 | 9/1962 | Friedman | 174—68.5 |
| 3,055,787 | 9/1962 | Mackenzie | 156—235 |
| 3,098,951 | 7/1963 | Ayer et al. | 175—68.5 |

OTHER REFERENCES

Welded Circuitry for Miniaturization by D. A. Sayles, EEM File System, Section 1700, pages 8 and 9, June 1960.

EARL M. BERGERT, *Primary Examiner.*

J. P. WILDMAN, *Examiner.*

R. S. SMITH, D. L. CLAY, M. L. KATZ,
*Assistant Examiners.*